Patented Jan. 6, 1942

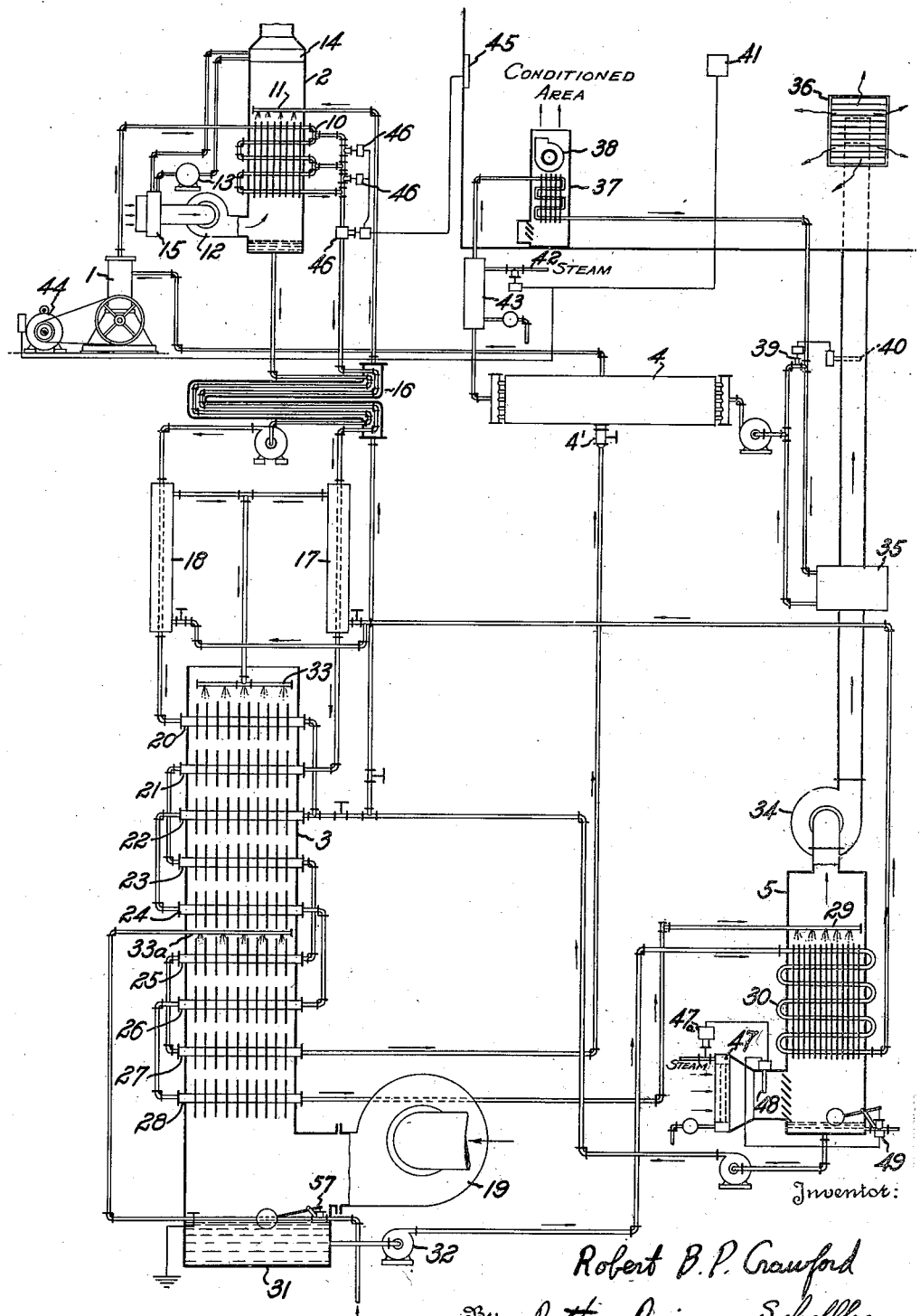

2,269,053

UNITED STATES PATENT OFFICE 2,269,053

AIR CONDITIONING SYSTEM

Robert B. P. Crawford, Athens, Ga.

Application October 17, 1939, Serial No. 299,883

12 Claims. (Cl. 62—129)

This invention relates to a system for the conditioning of enclosures by the adjustment of the heat and humidity content to a desired level or range and is particularly directed to a system involving the combined use of mechanical refrigeration and absorption.

A principal object of the invention is to provide a system for the conditioning of enclosures wherein a compression-evaporation refrigeration system is used for the removal of sensible heat and an absorbing medium, for example, a hygroscopic liquid is used for the removal of latent heat.

A further object of the invention is the provision of a combined system wherein the heat of compression and condensation of the refrigerant medium, such as Freon, is utilized for the concentration of the hygroscopic solution.

A further object of the invention is the provision of a combined system whereby the evaporative cooling effect of atmospheric air is utilized for the cooling of the liquefied refrigerant medium or the hygroscopic absorption medium or both.

Further objects and advantages will be apparent from the following description of an illustrative embodiment of the invention with particular reference to the accompany drawing.

The system illustrated comprises a refrigerant compressor 1, a concentrator 2, an evaporative cooling tower 3, an expansion water cooler 4, and a dehumidifying chamber 5, together with suitable heat exchange and control devices. The system will be described with reference to the use of Freon as a refrigerant medium and calcium chloride brine as a hygroscopic or dehumidifying agent.

The Freon compound compressed in compressor 1 to 265 pounds per square inch is conducted through extended surface coils 10 of concentrator 2. Here it gives up its heat of compression and condensation to diluted calcium chloride brine flowing over the coils from sprays 11, and is condensed at say 155° F.

The heated brine is concentrated by the action of a current of air blown upwards over coils 10 by blower 12. Increased heat economy may be obtained by the use of a heat transfer medium circulated by pump 13 between the heated outgoing air at 14 and the incoming air at 15. The Freon and the hot concentrated brine pass through a heat exchanger 16 wherein they are cooled by the brine passing to the concentrator. The Freon and the concentrated brine are further cooled by heat exchange with a stream of water in parallel heat exchangers 17 and 18, respectively, the Freon being cooled, for example, to about 105° F. and the brine to about 120° F.

The Freon and brine are then passed through extended surface coils in evaporative cooling tower 3, being supplied to the tower at points where the equilibrium wet bulb temperature is approximately the same as the temperature of the Freon and brine, respectively. The brine passes serially through coils 20, 22, 24, 26 and 28, and the Freon through alternating coils 21, 23, 25 and 27.

The Freon and brine are cooled in the tower by the evaporative cooling effect of a current of air blown upwards through the tower by blower 19 where it evaporates and cools water from heat exchangers 17, 18 to a temperature approaching the wet bulb temperature of the available air, say 80° F. if the atmospheric air has a dry bulb temperature of 100° F. and a dew point of 73° F.

The Freon coming from coil 27 at about 90° F. is expanded through valve 4' into water cooler 4, cooling the water therein to about 60° F., and the gaseous Freon at about 55° F. is returned to compressor 1.

Cooled concentrated brine at about 87° F. is sprayed through sprays 29 in dehumidifier 5 over extended surface coils 30 through which water at about 85° F. from the sump 31 of evaporating cooling tower 3 is circulated by means of pump 32. This water is then returned through heat exchangers 17, 18 to sprays 33 at the top of evaporative cooling tower 3. The water evaporated in cooling tower 3 is replenished through float controlled valve 57. The make-up water is preferably added to the tower, for example, through sprays 33a, at a point where the equilibrium wet bulb temperature is approximately the same as the temperature of the available water supply.

Atmospheric air at, say 100° F. dry bulb, 80° F. wet bulb, and 73° F. dew point is drawn through dehumidifier 5 by blower 34 and is cooled and dehumidified herein to 92° F. dry bulb, 66° F. wet bulb and 50° F. dew point. This air is then further cooled by heat exchange with cool water in heat exchanger 35 to a dry bulb temperature of, for example, 80° F. and is led into the conditioned area through registers 36.

The cold water from expansion cooler 4 passes to radiators 37 in the conditioned area, air in the area being circulated over the radiators by fans 38. Water from the radiators is circulated through exchanger 35 in returning to cooler 4, the amount of water passing to the exchanger being controlled by valve 39 actuated by thermostat 40 in the air duct leading to the conditioned area.

The temperature in the conditioned area is controlled by thermostat 41 which actuates valve 42 supplying steam to tempering coil 43 and also governs motor 44 which drives compressor 1.

The humidity in the conditioned area is controlled by humidostat 45 which actuates valves 46 governing the amount of heating surface in concentrator 2 by varying the amount of coil 10 through which the compressed refrigerant is caused to flow, thus regulating the concentration of the brine supplied to dehumidifier 5. In periods of high humidity and low dry bulb temperature, humidostat 45 may be also utilized to actuate the supply of additional heat to concentrator 2 from an outside source, not shown.

The temperature of the air drawn into dehumidifier 5 is prevented from falling to a point low enough to cause solidification of the brine in the humidifier by means of steam tempering coil 47 controlled by valve 47a actuated by thermostat 48. Thermostat 48 may also actuate float valve 49 to permit the addition of water to the brine when the temperature of the entering air falls below a predetermined limit. Valve 49 may be interconnected with valve 47a through a potentiometer circuit, which may be precalibrated to a very close degree of adjustment.

In general, it is desirable that the heat of compression and condensation of the refrigerant cycle should balance the heat required for concentrating the hygroscopic liquid under average conditions prevailing in the region of the installation.

Instead of the air draft concentrator shown in the drawing, the concentrator may be advantageously operated as a reduced pressure evaporator, the vapors from the concentrator being drawn out by means of a water ejector utilizing water from the dehumidifier cooling circuit discharged by pump 32. This water is sprayed upwardly into the evaporative cooling tower, in accordance with the method described in my application Serial No. 215,280, filed June 22, 1938, now Patent No. 2,200,442, issued May 14, 1940, the water being supplied to the tower at a point where the equilibrium temperature is approximately the same as the temperature of the water coming from the ejector, for example, between coils 25 and 26.

It will be seen that the invention provides a flexible system of combined compression-expansion cooling and hygroscopic solution dehumidification in which the heat of compression and condensation of the refrigerant is utilized in the concentration of the hygroscopic solution, and in which the cooling of the refrigerant liquid and the dissipation of the heat of dehumidification are effected by the evaporative cooling effect of atmospheric air on a water cooling circuit operating under truly counter-current heat exchange principles throughout the system.

I claim:

1. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant under evaporative conditions for concentration of the hygroscopic liquid and condensation of the refrigerant, and means for bringing the concentrated hydroscopic liquid into heat exchange relationship with water while subjecting the water to the evaporative cooling effect of a current of air.

2. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant under evaporative conditions for concentration of the hygroscopic liquid and condensation of the refrigerant, and means for bringing the concentrated hygroscopic liquid into heat exchange relationship with water while subjecting the water to the evaporative cooling effect of a current of air flowing counter-current to said hygroscopic liquid and said water.

3. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant under evaporative conditions for concentration of the hygroscopic liquid and condensation of the refrigerant, and means for bringing the condensed refrigerant into heat exchange relationship with water while subjecting the water to the evaporative cooling effect of a current of air.

4. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant under evaporative conditions for concentration of the hygroscopic liquid and condensation of the refrigerant, and means for bringing the condensed refrigerant into heat exchange relationship with water while subjecting the water to the evaporative cooling effect of a current of air flowing counter-current to said condensed refrigerant and said water.

5. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygrosocpic liquid for removal of moisture from the air, heat exchange means whereby the hygroscopic liquid is brought into heat exchange relationship with the compressed refrigerant under evaporative conditions for concentration of the hygroscopic liquid and condensation of the refrigerant, and means for bringing the condensed refrigerant and the concentrated hygroscopic liquid into heat exchange relationship with water while subjecting the water to the evaporative cooling effect of a current of air flowing counter-current to said condensed refrigerant, said hygroscopic liquid and said water.

6. In an air conditioning system wherein sensible heat is removed by the expansion of a liquefied refrigerant and moisture is removed by a hygroscopic liquid, the steps comprising condensing the refrigerant by heat exchange with the hygroscopic liquid while maintaining the hygroscopic liquid under conditions of free evaporation, and thereafter removing the heat from the hygroscopic liquid by the evaporative cooling effect of a stream of water in contact with a current of air.

7. In an air conditioning system wherein sensible heat is removed by the expansion of a liquefied refrigerant and moisture is removed by a hygroscopic liquid, the steps comprising condensing the refrigerant by heat exchange with the hygroscopic liquid while maintaining the hygroscopic liquid under conditions of free evaporation, and thereafter subjecting the hygroscopic liquid and the condensed refrigerant to the evaporative cooling effect of a stream of water in contact with a current of air.

8. An air conditioning system comprising in combination a refrigerant circuit comprising a compressor, extended surface condensing coils, extended surface cooling coils, an expansion chamber in heat exchange relationship with the conditioned area and means for passing a refrigerant medium serially through said compressor, condensing coils, cooling coils and expansion chamber; a dehumidifying circuit including extended surface cooling coils, an extended contact surface adapted for directly contacting air with a hygroscopic liquid, and means for passing a hygroscopic liquid serially through said cooling coils, over said extended surface and over the extended surface condensing coils of the refrigerant circuit; means for passing a stream of water under conditions of free evaporation over the extended surface cooling coils of both the refrigerant circuit and the dehumidifying circuit; means for passing a current of air in direct contact with the hygroscopic liquid passing over said extended surface, and means for conducting said current of air into said conditioned area.

9. An air conditioning system comprising in combination a refrigerant circuit comprising a compressor, extended surface condensing coils, extended surface cooling coils, an expansion chamber in heat exchange relationship with the conditioned area and means for passing a refrigerant medium serially through said compressor, condensing coils, cooling coils and expansion chamber; a dehumidifying circuit including extended surface cooling coils, an extended contact surface adapted for directly contacting air with a hygroscopic liquid, and means for passing a hygroscopic liquid serially through said cooling coils, over said extended surface and over the extended surface condensing coils of the refrigerant circuit, means for passing a stream of water under conditions of free evaporation over the extended surface cooling coils of both the refrigerant circuit and the dehumidifying circuit, means for bringing said stream of water into heat exchange relation with the extended contact surface of the dehumidifying circuit, means for passing a current of air in direct contact with the hygroscopic liquid passing over said extended surface, and means for conducting said current of air into said conditioned space.

10. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant, under evaporative conditions for concentration of the hygroscopic liquid and condensation of the refrigerant, an evaporative cooling tower including a plurality of extended surface coils, means for causing a stream of water to flow downwardly over said coils, means for flowing a stream of air upwardly over said coils, means for passing condensed refrigerant through a portion of said coils, and means for passing concentrated brine through another portion of said coils.

11. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant, under evaporative conditions for concentration of the hygroscopic liquid and condensation of the refrigerant, an evaporative cooling tower including a plurality of extended surface coils, means for causing a stream of water to flow downwardly over said coils, means for flowing a stream of air upwardly over said coils, means for passing condensed refrigerant through a portion of said coils, means for passing concentrated brine through another portion of said coils, and means for bringing water which has passed over said coils into heat exchange relationship with the air being contacted with the hygroscopic liquid.

12. An air conditioning system comprising a compression-expansion refrigerant cycle including heat transfer means for the transfer of heat from the conditioned area to the refrigerant, a hygroscopic liquid cycle including means for contacting air supplied to the conditioned area with the hygroscopic liquid for removal of moisture from the air, heat exchange means whereby the hygroscopic liquid is brought into heat exchange relationship with the compressed refrigerant under evaporative conditions for concentration of the hygroscopic liquid and condensation of the refrigerant, means for subjecting a stream of water to the evaporative cooling effect of a current of air, and means for bringing the condensed refrigerant and the concentrated hygroscopic liquid into heat exchange relationship with the stream of water at points where the temperature of the water is substantially the same as the temperature of the refrigerant and the hygroscopic liquid being brought into heat exchange relationship therewith.

ROBERT B. P. CRAWFORD.